United States Patent Office 2,698,820
Patented Jan. 4, 1955

2,698,820

PESTICIDAL COMPOSITIONS AND THEIR USE

Jack S. Newcomer, Grand Island, N. Y., assignor to Sharples Chemicals Inc., a corporation of Delaware No Drawing. Application May 21, 1951,
Serial No. 227,524

10 Claims. (Cl. 167—22)

The present invention pertains to pest control, and to methods and compositions for protecting materials, particularly organic materials, against attack by pests. The invention also pertains to a new organic compound which is employed as an active ingredient of compositions prepared for use in the control of pests, such as fungi, bacteria, and insects. Still more particularly, the invention pertains to compositions which are extremely effective agents for killing microorganisms.

It is an object of this invention to provide compositions of outstanding value in protecting organic material, both in the natural and artificial state, due to the fact that said compositions are highly effective in controlling economically harmful pests which attack organic material. A further object of the invention is to provide pesticidal compositions which contain, as an essential active ingredient thereof, 1,1,3,5,5-pentachloro-3-penten-2-one and/or 1,1,5-trichloro-4-pentene-2,3-dione. A still further object is to provide compositions which are highly effective, at very low concentrations of active ingredient, in killing microorganisms or preventing or inhibiting their growth. Another object of the invention is to treat agricultural materials, whether in the natural or fabricated state, with the new compositions of the invention, thereby both disinfecting and preserving such agricultural products. These and other objects will be apparent from this specification.

In the practice of the invention there is applied to the material which is to be protected against attack by pests, at least one compound from the group consisting of 1,1,5-trichloro-4-pentene-2,3-dione and 1,1,3,5,5-pentachloro-3-penten-2-one, the formulas which are as follows:

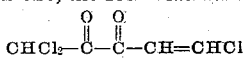

and

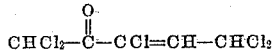

respectively.

The above diketone, 1,1,5-trichloro-4-pentene-2,3-dione, may be prepared by any means known to the art, such as by reactions which have been reported by Zincke, Ber. 23, 3781, and by Zincke and Fuchs, Ber. 26, 499. These reactions are summarized as follows:

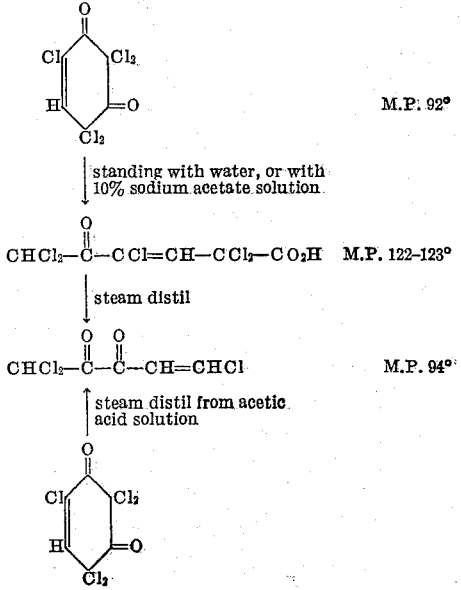

It will be noted that according to Zincke, the above cyclic diketone 2,2,4,6,6-pentachloro-4-cyclohexene-1,3-dione may be converted to the straight chain diketone of this invention, namely, 1,1,5-trichloro-4-pentene-2,3-dione, either directly as indicated above, or by way of an intermediate, namely, 5-oxo-2,2,4,6,6-pentachloro-3-hexenoic acid, also as indicated above.

I have made the surprising discovery that by treating 2,2,4,6,6-pentachloro-4-cyclohexene-1,3-dione in accordance with my procedure, which differs from the procedure of Zincke, I obtain the straight-chain monoketone, 1,1,3,5,5-pentachloro-3-penten-2-one, a previously unknown compound which when pure has a melting point of 49–50° C.

In order to obtain this chlorinated monoketone I treat 2,2,4,6,6-pentachloro-4-cyclohexene-1,3-dione with hot water or steam, but I avoid the use of Zincke's reagents such as acetic acid and sodium acetate.

I find that rather small but significant yields of 1,1,3,5,5-pentachloro-3-penten-2-one are obtained by refluxing a mixture comprising the above-mentioned cyclic diketone and water, followed by steam distillation of the reaction mixture; that better yields are obtained by passing steam through the cyclic diketone in molten condition; and that good yields are obtained by maintaining contact between water and the cyclic diketone at more moderate temperatures, such as say between approximately 50° C. and 80° C., a range of from 60° C. to 75° C. being preferred.

As will be seen, my various specific procedures mentioned in the foregoing paragraph for preparing my new 1,1,3,5,5-pentachloro-3-penten-2-one from the well-known 2,2,4,6,6-pentachloro-4-cyclohexene-1,3-dione are merely modifications of the fundamental process whereby the said cyclic diketone is maintained in contact with water (as the sole reagent) at elevated temperature (steam being thus included) for a time sufficient for formation of the said straight-chain monoketone. For treatment with steam at temperatures below 100° C., obviously the pressure would be reduced to below atmospheric. Various other modifications are possible, as will be understood.

The above straight-chain monoketone is readily convertible to 1,1,5-trichloro-4-pentene-2,3-dione by means of water treatment at elevated temperature.

The following examples are given by way of illustration and not of limitation. Examples 1–3 more particularly illustrate my invention with respect to the preparation of 1,1,3,5,5-pentachloro - 3 - penten-2-one, while Examples 4–9 more particularly pertain to pesticidal compositions containing the active ingredients of the invention, and to ways of employing the same. In Examples 4–9, concentrations are expressed as parts by weight.

EXAMPLE 1

A mixture of 2,2,4,6,6-pentachloro-4-cyclohexene-1,3-dione (282 g.), (prepared in 96% yield by chlorination of resorcinol), and water (300 g.) was refluxed for 6 hours at 100–109° C. The mixture was then steam distilled, with recycling of the condensed aqueous phase, until the ratio by weight of organic layer to aqueous phase in the distillate was approximately 1:500. The organic layer was separated, cooled, and filtered; 31 g. of solid 1,1,5-trichloro-4-pentene-2,3-dione was thus obtained. The filtrate comprised 4 g. of liquid, i. e. impure 1,1,3,5,5-pentachloro-3-penten-2-one.

In a similar experiment in which the period of reflux was decreased to 3.5 hours, only 8 g. of 1,1,5-trichloro-4-pentene-2,3-dione was obtained.

EXAMPLE 2

Molten 2,2,4,6,6-pentachloro-4-cyclohexene-1,3-dione, M. P. 92°, (282 g.) was steam distilled under conditions such that the product was removed from the reaction mixture almost as rapidly as it formed, that is, as rapidly as its partial pressure would permit. The steam distillation was discontinued after 3000 ml. of distillate had been collected. The oily layer (36 g.) of the distillate was separated, dissolved in hexane, cooled to −60° C., and allowed to warm slowly to room temperature while the walls of the vessel containing the oil were scratched continuously with a glass rod. After prolonged scratching a white solid was obtained, which after several recrystallizations from hexane melted at 49–50° C. It was found to boil at 116–118° C. at 18 mm., and is 1,1,3,5,5-pentachloro-3-penten-2-one. Chlorine: found, 68.6%; theoretical, 69.1%.

EXAMPLE 3

A mixture of 2,2,4,6,6-pentachloro-4-cyclohexene-1,3-dione (564 g.) and water (1500 g.) was stirred vigorously at 68–73° C. Carbon dioxide was evolved, stirring being continued until this evolution had nearly ceased. The mixture was cooled to room temperature and the organic layer, a brown oil weighing 338 g., was separated; this represented a 66.3% yield of crude 1,1,3,5,5-pentachloro-3-penten-2-one.

The oil was rectified to give 1,1,3,5,5-pentachloro-3-penten-2-one as a pale yellow liquid, B. P. 118° C. at 18 mm. The liquid is difficult to crystallize without seeding, but it was caused to crystallize by seeding it with a previously prepared authentic specimen of the same compound. The solid thus obtained was recrystallized from hexane to give white crystals, M. P. 49–50° C.

Treatment of part of the above liquid product with water and steam, as in the procedure of Example 1, gave a small yield of 1,1,5-trichloro-4-pentene-2,3-dione.

EXAMPLE 4

1,1,5-trichloro-4-pentene-2,3-dione was evaluated as a fungicide by the slide-spore germination procedure, in which the percentage of inhibition of spore germination is determined after a specified incubation period. These tests were conducted in accordance with the American Phytopathological Society method, except that they were continued for three days instead of only one day. The microorganisms employed were the brown peach-rot fungus (*Sclerotinia fructicola*), the apple bitter-rot fungus (*Glomerella cingulata*), and the apple-scab fungus (*Venturia inaequalis*.) These organisms are typical of those which cause some of the major and difficultly controlled plant diseases. The data obtained are given in Table 1, wherein the abbreviations Scler., Glom., and Vent. designate the respective fungi.

This diketone is fungicidal, not merely fungistatic, as evidenced by the fact that the spores showed no growth even after an incubation period of three days.

Tetrachloro-p-quinone (commonly called chloranil), a commercial fungicide, was found to be effective against these organisms at dilutions no greater than an undetermined value lying between 1:10,000 and 1:100,000.

*Table 1*

| Dilution | Incubation period, days | Inhibition of Spores, Percent | | |
|---|---|---|---|---|
| | | Scler. | Glom. | Vent. |
| 1:10,000 | 1 | 100 | 100 | 100 |
| | 2 | 100 | 100 | 100 |
| | 3 | 100 | 100 | 100 |
| 1:100,000 | 1 | 100 | 100 | 100 |
| | 2 | 100 | 100 | 100 |
| | 3 | 100 | 100 | 100 |
| 1:1,000,000 | 1 | 100 | 100 | 100 |
| | 2 | 100 | 100 | 100 |
| | 3 | 100 | 100 | 100 |

The formulations employed were water solutions of the protectant.

EXAMPLE 5

Laxtonian pea seeds were treated with varying concentrations of 1,1,5-trichloro-4-pentene-2,3-dione by mixing the seeds with the chemical in a motor-driven mixing machine, without the use of a solvent. The particular concentrations employed were 0.015%, 0.031%, 0.06%, 0.125%, and 0.25%, based on the weight of the seeds. Other samples of the seeds were treated with the same concentrations of chloranil, the generally recommended concentration of this material for seed protection purposes being 0.25%.

The respective groups of treated seeds were planted in soil containing soil-borne organisms which cause damping-off. Untreated seeds were planted in the same soil to serve as controls.

Table 2 summarizes the percentage stand of pea seedlings 15 days after planting.

*Table 2*
STAND OF PEA SEEDLINGS, PERCENT

| Conc. of protectant, percent | Untreated controls | Chloranil | 1,1,5-Trichloro-4-pentene-2,3-dione |
|---|---|---|---|
| 0.015 | 11 | 9 | 55 |
| 0.031 | 8 | 16 | 56.6 |
| 0.06 | 6 | 20 | 83.3 |
| 0.125 | 1.6 | 40 | 86.6 |
| 0.25 | 5.0 | 80 | 80 |

The results show that 1,1,5-trichloro-4-pentene-2,3-dione is extremely effective in preventing damping-off of pea seeds. Whereas the disinfecting properties of chloranil decrease markedly at concentrations below 0.25% and become quite poor at concentrations of 0.06% and less, 1,1,5-trichloro-4-pentene-2,3-dione remains highly effective even at a concentration of 0.015%.

The method of application used in this experiment to apply the protectants to the seeds does not lead to uniform coverage of the seeds at protectant concentrations below 0.06%. The fact that 1,1,5-trichloro-4-pentene-2,3-dione gave about the same degree of effectiveness at the lower concentrations employed is indicative that the decrease in percentage stand as compared with higher concentrations of this chemical is due merely to inadequate coverage of the seeds with the chemical. Consequently, dilute solutions of the chemical in acetone were applied to seeds in order to throw light on the limit at which the chemical was no longer highly effective in preventing damping-off, as shown by the following example.

EXAMPLE 6

Separate groups of 80 Laxtonian pea seeds were treated with solutions of 1,1,5-trichloro-4-pentene-2,3-dione in acetone such that the concentrations of chlorinated compound left on the seeds were 0.006%, 0.012%, 0.025%, 0.05%, and 0.10%, respectively, based on weight of seeds. Other groups of 80 untreated seeds were used at each concentration as controls. All seeds were planted in soil containing soil-borne organisms which cause damping-off. Table 3 shows the percentage stand of pea seedlings 9 days after planting.

*Table 3*
STAND OF PEA SEEDLINGS, PERCENT

| Conc. of protectant, percent | 1,1,5-Trichloro-4-pentene-2,3-dione | Untreated controls |
|---|---|---|
| 0.006 | 88 | |
| 0.012 | 84 | |
| 0.025 | 86 | 43 (average). |
| 0.05 | 93 | |
| 0.10 | 83 | |

A like experiment was carried out at a different time, with results as given in Table 4.

*Table 4*
STAND OF PEA SEEDLINGS, PERCENT

| Conc. of protectant, percent | 1,1,5-Trichloro-4-pentene-2,3-dione | Untreated controls |
|---|---|---|
| 0.006 | 80 | |
| 0.012 | 75 | |
| 0.025 | 83 | 45 (average). |
| 0.05 | 93 | |
| 0.10 | 95 | |

It will be noted that there is a considerable variation between the average germination of untreated controls in Example 6 and in Example 5. For testing purposes, a large stock pile of infected soil was kept on hand and was stored outside, subject to the normal vagaries of climate. Soil for each test was prepared by diluting this stock pile of infected soil with an amount, usually an equal amount, of non-infected soil. The soil for each flat or group of flats to be used at the time of any one test was thoroughly mixed so as to be uniform. Sufficient check rows were planted in each flat at the same time the treated seeds were planted to give a good approximation of the percent germinations of untreated controls. The actual percent stand obtained from these untreated controls may be as low as zero at the time of one test and as high as 40% or 50% at the time of another test. Normally when the controls show a stand above 50%, the test is discarded and re-run with another bath of infected soil.

EXAMPLE 7

Khaki textile strips (1" x 3") were dipped rapidly into acetone solutions containing 0.01%, 0.1%, and 1.0% of 1,1,5-trichloro-4-pentene-2,3-dione. The strips were then placed across a coarse screen and allowed to dry, after which they were buried for 14 days in well-rotted manure. The strips were then recovered, washed with water, and allowed to dry. The degree of protection of the fabrics was determined by visual observation and also by determining the tensile strength of the strips. The data obtained are illustrated as follows:

| Conc. of active ingredient, percent | Tensile Strength, lbs. Triplicate Experiments | | |
|---|---|---|---|
| | 1 | 2 | 3 |
| 1.0 | 152 | 162 | 144 |
| 0.1 | 89 | 111 | 103 |
| 0.01 | 63 | 77 | 53 |
| 0 (Control) | 35 | 54 | 54 |

EXAMPLE 8

The efficacy of 1,1,5-trichloro-4-pentene-2,3-dione as an insecticide was demonstrated by applying dilute acetone solutions of the chemical to houseflies (*Musca domestica*). The standard drop-deposition method for evaluation was employed. The results were recorded 24 hours after treatment. It was found that 100% of the flies were either dead or seriously affected when the above active ingredient was applied in concentrations as low as 0.5% in acetone. A control test conducted with acetone alone showed no flies dead or affected.

EXAMPLE 9

1,1,3,5,5-pentachloro-3-penten-2-one was evaluated as a fungicide by the slide-spore germination procedure, using the same organisms and test method as described in Example 4. The results obtained are given in Table 5.

*Table 5*

| Dilution | Incubation period, days | Inhibition of Spores, percent | | |
|---|---|---|---|---|
| | | Scler. | Glom. | Vent. |
| 1:10,000 | 1 | 100 | 100 | 100 |
| | 2 | 100 | 100 | 100 |
| | 3 | 100 | 100 | 100 |
| 1:100,000 | 1 | 100 | 100 | 100 |
| | 2 | 100 | 100 | 100 |
| | 3 | 100 | 100 | 100 |
| 1:1,000,000 | 1 | 5 | 75 | 100 |
| | 2 | 0 | 0 | 100 |
| | 3 | 0 | 0 | 0 |

The formulations employed were water emulsions prepared in the presence of 0.1% of the emulsion of a surface-active agent, e. g., soap.

As will be evident from the foregoing, it is not necessary in the preparation of the active ingredients to isolate them from each other prior to their use for pest control purposes, although this may be done if desired. Likewise, it will be evident that the active ingredients may be employed in other than highly purified state. Thus the monoketone of this invention may be employed in uncrystallized, liquid form if desired, and similar considerations conceivably might apply to the diketone. It is pointed out that the specific pests employed in the above examples are merely representative of pests against which my compositions may be used.

It will be understood that my active ingredients may be used individually or in admixtures with each other for the desired purposes.

The active ingredients of this invention may be applied in a variety of ways to materials which are to be protected against attack by microorganisms, such as by dusting, spraying, dipping, or tumbling, as best suits the protection problem at hand. They may be used as such in certain cases, but more frequently they are formulated with carriers before application. Carriers may be liquid, for example, water or certain oils, or solid, for example, any of the solid carriers or mixtures thereof more particularly referred to hereinafter.

Compositions may be formulated by mixing the active ingredients with any desired liquid or solid carriers, such as any of the finely divided solid carriers known in the dusting art, which are preferably of large surface area, such as clays, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer Clay, Celite, and Tripoli may be mentioned as typical.

Non-clay carriers which may be formulated with my active ingredients include, for example, sulfur, volcanic ash, lime products such as hydrated lime and calcium carbonate, by-product lignin, lignocellulose, flours such as wood, walnut shell, wheat, soybean, potato and cotton seed, or any other suitable material employed for similar purposes in the art.

Any desired formulation may be prepared by any suitable method. Thus the active ingredient, preferably in finely divided form if a solid, may be tumbled together with the carrier, or the carrier and the active ingredient may be ground together. Alternatively, the active ingredient in liquid form, including solutions, dispersions, emulsions, and suspensions thereof, may be admixed with the solid carrier in finely divided form in amounts small enough to preserve the free-flowing property of the final dust composition. If desired, excess liquid may be removed, such as by vaporization, for example, under reduced pressure.

When solid compositions are employed, in order to obtain a high degree of coverage with a minimum dosage of the formulation, it is desirable that the formulation be in finely divided form. Preferably, the dust containing the active ingredient should be sufficiently fine that substantially all will pass through a 50 mesh sieve, and more particularly through a 200 mesh sieve. Appreciably larger particle size is less conducive to obtaining an economic application of the material; finer dusts, although they have excellent covering capacity, are somewhat more subject to drift and are more expensive to prepare.

For dusting purposes I prefer a formulation in which the active ingredient is present to the extent of say 10–50% by weight of the total. Such amounts normally give free-flowing products which dust easily. However, these concentrations are only indicative of ranges that give desirable qualities to dusting compositions, and formulations may be made with higher or lower active ingredient content. Thus, compositions containing between say 1% to 99% of active ingredient by weight are contemplated, the remainder being carrier and/or any other additive or adjuvant material which may be desired.

It is often advantageous to add small percentages of wetting agents to dust formulatons, such as the wetting agents mentioned hereinafter.

For spray application the active ingredient may be dissolved or dispersed in a liquid carrier, such as water or other suitable liquid.

Aqueous solutions or dispersions are economical, and hence are frequently preferred. In general, the choice of the particular liquid carrier employed will be guided somewhat by prevailing circumstances, such as its availability, its solubility or dispersion characteristics toward the particular active ingredient, and in the case of the treatment of plants, by its toxicity to such plants. In general, water is an excellent liquid carrier, although in the case of the treatment of plants a relatively nonphytotoxic oil, such as diesel oil #2, may at times be preferred.

Thus, spray formulations comprising the active ingredient in the form of a solution, suspension, dispersion, or emulsion, in aqueous or non-aqueous media may be employed.

Emulsions or dispersions of the active ingredient in the liquid carrier may be prepared by agitation of the active ingredient with the carrier. In many instances this is done at the time of spraying. Preferably, however, the agitation should take place in the presence of an emulsifying or dispersing agent (surface-active agent), in order to facilitate the preparation of said emulsion or dispersion. Emulsifying or dispersing agents are well-known in the art, and include, for example, fatty alcohol sulfates, such as sodium lauryl sulfate, aliphatic or aromatic sulfonates, such as sulfonated castor oil or fish oil, or the various alkaryl sulfonates (such as the sodium salt of mono-sulfonated nonyl naphthalene or tertiary dodecyl benzene), or the soaps, such as sodium oleate and sodium stearate, or non-ionic types of emulsifying and dispersing agents such as the high molecular weight alkyl polyglycolethers or analogous thioethers such as the decyl, dodecyl, and tetradecyl polyglycolethers and thioethers containing from 25 to 75 carbon atoms. Such emulsifying and dispersing agents, it will be noted, also commonly possess wetting agent properties.

The use, if desired, of adjuvants, such as wetting agents and/or humectants, is also contemplated in connection with solutions, suspensions, dispersions, emulsions, or solid formulations of the active ingredient. Any suitable wetting agent and/or humectant may be employed for this purpose, such as the wetting agents more particularly referred to above.

Examples of humectants are glycerine, diethylene glycol, ethylene glycol, polyethylene glycols generally, and well-known sugars and sugar-containing mixtures, such as glucose, fructose, sucrose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more, based on active ingredient. For mere wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent, these considerations being particularly applicable in the case of the treatment of plants.

It should be noted that after liquid formulations of my active ingredients have been applied to plants, the concentration of wetting agent existing upon such treated plants is in no sense a function of the concentration existing in the original formulation. Thus, evaporation might concentrate the wetting agent considerably, or the presence of dew on plant surfaces, or of plant juices on such surfaces might considerably dilute the wetting agent.

It will of course be understood that wetting agents, particularly when in solid form, may be compounded with solid forms of the active ingredient.

Although the active ingredients of this invention may be applied without dilution to materials which are to be protected against attack by microorganisms, it is usually desirable to employ liquid or solid formulations, for example, formulations such as those discussed above. In the case of liquid formulations, the active ingredient usually constitutes less than 30% by weight of the total, such as less than 10% and even as low as 0.1%.

Other substances than the carrier, surface-active agent, and/or humectant may be included in solid or liquid formulations of the active ingredients if desired, such other substances including spreaders, stickers, and other auxiliary materials. Active ingredients other than those disclosed herein and compatible with the formulation may be added if desired for any particular purpose. For example, it may at times be expedient to include singly or in combination, substances such as plant response agents, or substances such as fungicides, insecticides, or bactericides other than those agents discussed herein. Also, substances may be added to bring about various physical improvements such as prevention of lumping during storage, etc.

In addition to the treatment of agricultural products generally including growing plants, seeds, etc. for destroying plant disease organisms or preventing or inhibiting their growth, the compositions of this invention are generally useful as bactericidal agents and fungicides. For example my compositions may be employed advantageously as preservatives for such substances as rawhide, adhesives such as glue, gelatin, leather, cellulosic substances such as cork, wood, cotton fabric, cordage, etc., wool, ink, casein products, and other natural or manufactured products that are subject to attack or decomposition by various bacteria and molds.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

I claim:

1. A composition prepared for use in combating microorganisms and insects which comprises a surface active agent, and at least one of the group consisting of 1,1,5-trichloro-4-pentene-2,3-dione and 1,1,3,5,5-pentachloro-3-penten-2-one, said composition forming an emulsion with water upon agitation therewith.

2. A composition prepared for use in combating microorganisms which comprises a surface active agent, and 1,1,5-trichloro-4-pentene-2,3-dione, said composition forming an emulsion with water upon agitation therewith.

3. A composition prepared for use in combating microorganisms which comprises a surface active agent, and 1,1,3,5,5-pentachloro-3-penten-2-one, said composition forming an emulsion with water upon agitation therewith.

4. A process for reducing deleterious effects upon an object due to the action of microorganisms which comprises treating said object with at least one of the group consisting of 1,1,5-trichloro-4-pentene-2,3-dione and 1,1,3,5,5-pentachloro-3-penten-2-one.

5. The process of claim 4 in which the microorganisms are bacteria.

6. The process of claim 4 in which the microorganisms are fungi.

7. A process for destroying microorganisms which comprises exposing the same to a lethal concentration of 1,1,5-trichloro-4-pentene-2,3-dione.

8. A process for destroying microorganisms which comprises exposing the same to a lethal concentration of 1,1,3,5,5-pentachloro-3-penten-2-one.

9. A process for destroying one of the group consisting of microorganisms and insects which comprises exposing the same to a lethal concentration of at least one of the group consisting of 1,1,5-trichloro-4-pentene-2,3-dione and 1,1,3,5,5-pentachloro-3-penten-2-one.

10. A process for protecting material susceptible to attack by microorganisms which comprises applying to said material an effective amount of at least one of the group consisting of 1,1,5-trichloro-4-pentene-2,3-dione and 1,1,3,5,5-pentachloro-3-penten-2-one.

References Cited in the file of this patent

UNITED STATES PATENTS 2,357,260    Joyce _____ Aug. 29, 1944

OTHER REFERENCES

Beilstein, "Handbuch der Orgen. Chemie," vol. 3, 4th ed. (1921), page 735.

Zincke et al., "Berichte der Deut. Chem. Gess.," vol. 23 (1890), pages 3778–9, 3784.

Zincke et al., "Berichte der Deut. Chem. Gess.," vol. 25 (1892), pages 2689, 2690.

Zincke et al., "Berichte der Deut. Chem. Gess.," vol. 26 (1893), pages 498, 499.